March 25, 1941.   K. SCHÖNFELDER   2,235,903

CORE STRUCTURE FOR DYNAMOELECTRIC MACHINES

Filed March 14, 1940

WITNESSES:
C. J. Weller.
F. C. Lyle

INVENTOR
Kurt Schönfelder.
BY
O. B. Buchanan
ATTORNEY

Patented Mar. 25, 1941

2,235,903

UNITED STATES PATENT OFFICE 2,235,903

CORE STRUCTURE FOR DYNAMOELECTRIC MACHINES

Kurt Schönfelder, Berlin-Charlottenburg, Germany, assignor to Westinghouse Electric & Manufacturing Company, East Pittsburgh, Pa., a corporation of Pennsylvania Application March 14, 1940, Serial No. 323,918
In Germany December 24, 1938

15 Claims.  (Cl. 171—252)

The present invention relates to dynamoelectric machines and, more particularly, to the construction of the rotor and stator cores of such machines.

The rotor and stator cores of dynamoelectric machines are usually built up of laminations, which are assembled in a stack and clamped together to form a laminated cylindrical core. The stator laminations are annular and have teeth on their inner peripheries, while the rotor laminations are circular and have teeth on their outer peripheries, so that when the core is assembled the teeth form generally longitudinal slots in which the windings are placed. When such a machine is in operation, the electrical and magnetic forces to which the cores are subjected cause the core, and particularly the teeth, to vibrate circumferentially. This vibration is undesirable and produces considerable noise in the operation of the machine which is very objectionable. Attempts have been made to reduce this vibration by selecting particular relations of the slot pitches in the rotor and stator, and by using different numbers of slots per pole per phase in the rotor and stator, but these methods are not satisfactory since they have only a limited effect in reducing the vibration, and they are not applicable to all machines.

The object of the present invention is to provide a core construction for dynamoelectric machines in which the vibration of the teeth is substantially eliminated, or at least greatly reduced, so that the objectionable noise during operation of the machine is also greatly reduced.

More specifically, the object of the invention is to reduce or suppress vibration of the teeth of a laminated core structure by forming them so that the natural frequencies of vibration are low and so that the internal consumption of energy in the teeth during vibration is very large. The large consumption of energy during vibration has a very strong damping effect which reduces the amplitude of the vibration to a very low value, while the low natural frequencies of vibration give low pitched tones so that the greatly reduced volume of noise produced is of low pitch and is not objectionable.

These results are readily obtained by splitting or otherwise dividing the teeth into parts which are narrower than an undivided tooth and which are in frictional engagement with each other, so that they rub against each other when the tooth vibrates and thus consume a large amount of energy. In this way a strong damping effect is produced which greatly reduces the amplitude of the vibration. Greater effectiveness can be obtained by splitting the teeth unsymmetrically so that the two parts have different natural frequencies. This increases the frictional rubbing and, therefore, the energy consumption, since the two parts of the tooth tend to vibrate at different frequencies, and by this means the vibration can be almost completely suppressed, thus practically eliminating the objectionable noise.

The invention will be more fully understood from the following detailed description, taken in connection with the accompanying drawing, in which.

Figure 1:
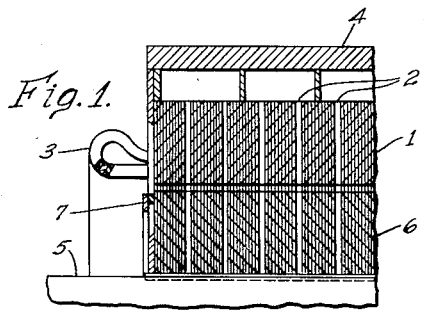
Figure 1 is a partial longitudinal sectional view of a dynamoelectric machine.

Fig. 1 shows more or less diagrammatically the usual construction of a dynamoelectric machine of relatively large size, such as an induction motor. This machine has a stator core 1 comprising a plurality of annular laminations which are clamped together in a stack to form a cylindrical core member, the laminations being divided into spaced groups to provide radial ventilating ducts 2 in the usual manner. The laminations of the core 1 have teeth on their inner periphery which form longitudinal slots for the reception of windings 3, and the core is supported in a suitable frame structure 4. The rotor member is secured to a shaft 5 and has a core 6 built up of circular laminations in a similar manner to the stator core 1. These laminations also have peripheral teeth to form longitudinal slots for the reception of a suitable winding indicated at 7.

Figure 2:
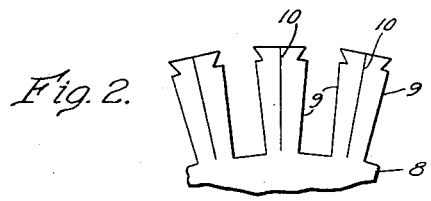
Fig. 2 is a fragmentary elevational view of a portion of a core member.
Figure 3:
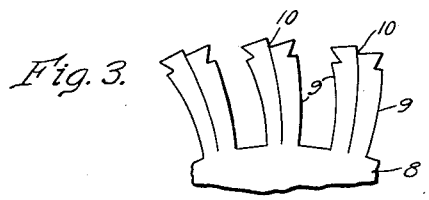
Fig. 3 is a view similar to Fig. 2 showing the deformation of the teeth during vibration.

Figs. 2 and 3 show on a somewhat enlarged scale a construction of the teeth for core members of the type shown in Fig. 1 to greatly reduce the vibration during operation of the machine and thus reduce the noise. These figures show a portion of a rotor core 8 having generally radial teeth 9 on its periphery, although it will be understood, of course, that the invention is applicable to both rotor and stator cores. In order to reduce the vibration of the teeth 9, they are divided into parts which are narrower than an undivided tooth and which are in frictional engagement with each other. As shown in the drawing, this is most conveniently done by splitting each tooth in a radial direction, as indicated at 10, to divide it into two substantially equal parts.

The effect of this construction is shown in Fig. 3, which shows the deformation of the teeth during vibration, the deformation being greatly exaggerated for the sake of clearness. It will be seen from this figure that when a tooth vibrates in a circumferential direction, there is a relative movement between the two parts of the tooth along the split 10, and since the two parts are in close contact, this relative movement causes a frictional rubbing between the two parts which consumes a large amount of energy. This large energy consumption produces a very strong damping effect and greatly reduces the amplitude of the vibration, thus reducing the noise caused by it. Since the parts of the split tooth are much narrower relative to their length than an undivided tooth, the natural frequency of vibration of each part is lower than that of an undivided tooth and, therefore, the noise caused by vibration of the split teeth is lower in pitch than that which would be produced by a tooth of the usual construction. Such low pitched tones are much less objectionable than the high pitched, penetrating tones caused by vibration of conventional teeth. Thus, it will be seen that the construction of Figs. 2 and 3 is effective to improve the operation of a machine in which this core structure is used by greatly reducing the amplitude of vibration of the teeth so that the noise during operation of the machine is greatly reduced in volume, and also that the small amount of noise which still occurs is relatively low pitched and is not objectionable.

Figure 6:
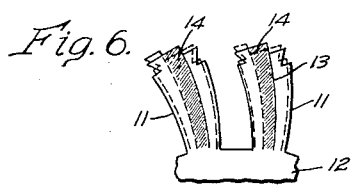
Fig. 6 is a somewhat diagrammatic view of the core member of Fig. 4, showing the deformation of the teeth during vibration.
Figure 4:
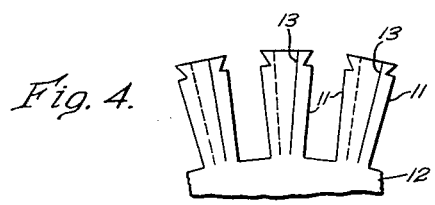
Fig. 4 is a fragmentary elevational view of a core member showing another embodiment of the invention.
Figure 5:
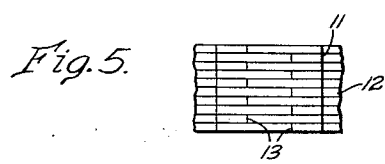
Fig. 5 is a fragmentary plan view on an enlarged scale of a portion of the core member of Fig. 4.

A still more effective embodiment of the invention is shown in Figs. 4, 5 and 6. In this embodiment the teeth 11 of a core member 12 are split unsymmetrically at 13, a desirable ratio for the widths of the two parts of the tooth being 65:35. Successive laminations are disposed in the stack so that the splits in corresponding teeth are offset from each other in order to cause the wider portions of corresponding teeth of successive laminations to overlap as shown in Fig. 5, which is an enlarged plan view of a portion of a single tooth.

The effect of this construction is shown in Fig. 6, which is a somewhat diagrammatic view showing the deformation of the teeth during vibration, the deformation being greatly exaggerated. As before, the two parts of each tooth rub on each other along the split 13 and cause a damping effect on the vibration. In addition, the wide parts of corresponding teeth of successive laminations overlap each other and are in frictional engagement, as indicated by the shaded areas 14 in Fig. 6. The rubbing action in these areas between the adjacent laminations also has a very strong damping effect, so that the amplitude of the vibrations is very materially reduced. Since each tooth is divided into parts of unequal widths, the two parts have different natural frequencies and tend to vibrate at different frequencies, so that the effectiveness of the rubbing action between them in damping the vibrations is greatly increased. Any tendency towards vibration axially of the core is effectively suppressed because of the very great frictional rubbing action which would occur due to the different amount of deformation of the tooth portions. It will be apparent, therefore, that this embodiment of the invention is very effective in greatly reducing the amplitude of the vibrations because of the strong damping action caused by the rubbing between the two parts of each tooth which tend to vibrate at different frequencies, and also because of the rubbing action between the overlapping parts of corresponding teeth of adjacent laminations. In this way the amplitude of the vibrations is reduced to a very small value and the noise caused by it is correspondingly reduced.

Figure 7:
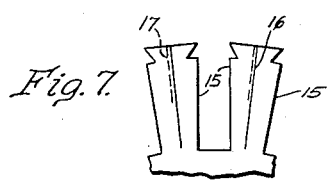
Figs. 7, 8, 9 and 10 are fragmentary elevational views similar to Figs. 2 and 4, showing further embodiments of the invention.

Another embodiment of the invention is shown in Fig. 7. In this form of the invention, the teeth 15 are split as indicated at 16 in the same manner as in Fig. 2, but the teeth of adjacent laminations are split to different radial depths, the split in the teeth of the next adjacent lamination being shown dotted at 17 in Fig. 7. In the assembly of a complete core, the laminations with deeper splits are alternated with those having shorter splits so that the teeth of each lamination lie between adjacent teeth which are split to different depths. The effect of this construction is similar to that of Fig. 2 but the damping action is somewhat greater because of the fact that the corresponding teeth of successive laminations have slightly different natural frequencies and, therefore, tend to vibrate at different rates, so that there is a certain amount of frictional rubbing between the adjacent laminations which increases the damping action.

Figure 8:
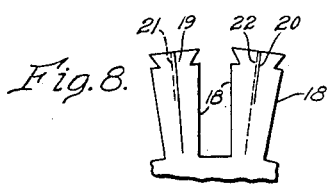

An alternative arrangement is shown in Fig. 8 in which successive teeth 18 of each lamination are split to different depths as indicated at 19 and 20. In assembling such a core, the adjacent laminations are reversed in position with respect to each other, so that each tooth is in contact with a tooth on the adjacent lamination which is split to a different depth, as indicated at 21 and 22. It will be apparent that the effect of this arrangement is the same as that of Fig. 7 in damping the vibrations.

Figure 9:
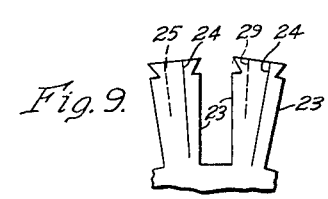

Still greater effectiveness can be obtained and vibration of the teeth almost completely eliminated by suitable combinations of the constructions described above. Thus, in Fig. 9 there is shown a combination of the constructions of Figs. 4 and 7. In this figure, each tooth 23 is split unsymmetrically at 24, while the teeth of adjacent laminations are split to different radial depths, as indicated at 25, and the laminations are arranged as in Fig. 4 so that the splits in corresponding teeth of adjacent laminations do not coincide. The effect of this arrangement is similar to that of Fig. 4 in that the two parts of each tooth have different natural frequencies, so that a very strong damping action is obtained by the frictional rubbing between them, while the overlapping parts of corresponding teeth on adjacent laminations also rub together to increase the damping effect, and this latter action is enhanced by the fact that the tooth parts thus rubbing together also have different natural frequencies. Thus, a very strong damping is obtained and the vibration is almost completely suppressed.

Figure 10:
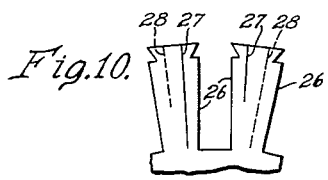

Fig. 10 shows another alternative arrangement combining the constructions of Fig. 4 and Fig. 8. In this arrangement, each tooth 26 is split unsymmetrically at 27, and the successive teeth of each lamination are split to different radial depths. Adjacent laminations are reversed with respect to each other as in Fig. 9, so that the splits in corresponding teeth do not coincide, the teeth of the adjacent lamination being split at 28. It will be apparent that the effect of this arrangement is the same as that of Fig. 9, and that the vibration will be substantially completely suppressed because of the very strong damping action which is obtained by this arrangement.

It should now be apparent that a construction has been provided for the core members of a dynamoelectric machine in which the vibration of the teeth of the core during operation of the machine is substantially suppressed, or at least very materially reduced, so that the noise caused by the machine during operation is reduced to a very small volume which is not objectionable. Several specific embodiments of the invention have been disclosed, but it is to be understood that various other constructions could also be used for damping the vibration of the teeth and lowering their natural frequencies. The invention is applicable to both rotor and stator cores and may be used with any type of tooth. It is to be understood, therefore, that the invention is not limited to the particular arrangements shown, but in its broadest aspects it includes all equivalent embodiments and modifications which come within the scope of the appended claims.

I claim as my invention:

1. A core structure for a dynamoelectric machine comprising a plurality of laminations disposed in a stack, each of said laminations having teeth on its periphery forming slots between them, and each of said teeth being divided into parts which are in frictional engagement with each other to cause a strong damping effect on vibration of the teeth.

2. A core structure for a dynamoelectric machine comprising a plurality of laminations disposed in a stack, each of said laminations having teeth on its periphery forming slots between them, and each of said teeth being divided into parts which have a lower natural frequency than that of an undivided tooth, said parts being in frictional engagement with each other to cause a strong damping effect on vibration of the teeth.

3. A core structure for a dynamoelectric machine comprising a plurality of laminations disposed in a stack to form a cylindrical core, each of said laminations having teeth on its periphery forming slots between them, and each of said teeth being split in a radial direction into two parts which are in frictional engagement with each other.

4. A core structure for a dynamoelectric machine comprising a plurality of laminations disposed in a stack to form a cylindrical core, each of said laminations having teeth on its periphery forming slots between them, and each of said teeth being split in a radial direction to divide the tooth into two parts of unequal width, said parts being in frictional engagement with each other.

5. A core structure for a dynamoelectric machine comprising a plurality of laminations disposed in a stack to form a cylindrical core, each of said laminations having teeth on its periphery forming slots between them, and each of said teeth being split in a radial direction to divide the tooth into two parts of unequal width, adjacent laminations being disposed so that the splits in their teeth are displaced from each other.

6. A core structure for a dynamoelectric machine comprising a plurality of laminations disposed in a stack to form a cylindrical core, each of said laminations having teeth on its periphery forming slots between them, and each of said teeth being split in a radial direction to divide the tooth into two parts of unequal width, the teeth of adjacent laminations being arranged so that the wider part of a tooth of one lamination overlies the narrow part of the corresponding tooth of the successive lamination.

7. A core structure for a dynamoelectric machine comprising a plurality of laminations disposed in a stack to form a cylindrical core, each of said laminations having teeth on its periphery forming slots between them, and each of said teeth being split in a radial direction, the teeth of different laminations being split to different radial depths.

8. A core structure for a dynamoelectric machine comprising a plurality of laminations disposed in a stack to form a cylindrical core, each of said laminations having teeth on its periphery forming slots between them, and each of said teeth being split in a radial direction, successive teeth of said lamination being split to different radial depths.

9. A core structure for a dynamoelectric machine comprising a plurality of laminations disposed in a stack to form a cylindrical core, each of said laminations having teeth on its periphery forming slots between them, and each of said teeth being split in a radial direction, successive teeth of each lamination and corresponding teeth of adjacent laminations being split to different radial depths.

10. A core structure for a dynamoelectric machine comprising a plurality of laminations disposed in a stack to form a cylindrical core, each of said laminations having teeth on its periphery forming slots between them, and each of said teeth being split in a radial direction to divide the tooth into two parts of unequal width, the teeth of different laminations being split to different radial depths.

11. A core structure for a dynamoelectric machine comprising a plurality of laminations disposed in a stack to form a cylindrical core, each of said laminations having teeth on its periphery forming slots between them, and each of said teeth being split in a radial direction to divide the tooth into two parts of unequal width, successive teeth of each lamination being split to different radial depths.

12. A core structure for a dynamoelectric machine comprising a plurality of laminations disposed in a stack to form a cylindrical core, each of said laminations having teeth on its periphery forming slots between them, and each of said teeth being split in a radial direction to divide the tooth into two parts of unequal width, successive teeth of each lamination and corresponding teeth of adjacent laminations being split to different radial depths.

13. A core structure for a dynamoelectric machine comprising a plurality of laminations disposed in a stack to form a cylindrical core, each of said laminations having teeth on its periphery forming slots between them, and each of said teeth being split in a radial direction to divide the tooth into two parts of unequal width, adjacent laminations being disposed so that the splits in their teeth are offset from each other, and the teeth of adjacent laminations being split to different radial depths.

14. A core structure for a dynamoelectric machine comprising a plurality of laminations disposed in a stack to form a cylindrical core, each of said laminations having teeth on its periphery forming slots between them, and each of said teeth being split in a radial direction to divide the tooth into two parts of unequal width, adjacent laminations being disposed so that the splits in their teeth are offset from each other, and successive teeth of each lamination being split to different radial depths.

15. A core structure for a dynamoelectric machine comprising a plurality of laminations disposed in a stack to form a cylindrical core, each of said laminations having teeth on its periphery forming slots between them, and each of said teeth being split in a radial direction to divide the tooth into two parts of unequal width, adjacent laminations being disposed so that the splits in their teeth are offset from each other, successive teeth of each lamination and corresponding teeth of adjacent laminations being split to different radial depths.

KURT SCHÖNFELDER.